(12) United States Patent
Hayasaka et al.

(10) Patent No.: US 11,906,636 B2
(45) Date of Patent: Feb. 20, 2024

(54) VEHICLE SENSOR MOUNTING STRUCTURE

(71) Applicant: TOYOTA JIDOSHA KABUSHIKI KAISHA, Toyota (JP)

(72) Inventors: Shoichi Hayasaka, Atsugi (JP);
Keisuke Hokai, Gotemba (JP);
Hiromitsu Urano, Numazu (JP);
Shuichi Yoshikawa, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 393 days.

(21) Appl. No.: 17/332,418

(22) Filed: May 27, 2021

(65) Prior Publication Data
US 2022/0035047 A1  Feb. 3, 2022

(30) Foreign Application Priority Data

Aug. 3, 2020  (JP) .................................. 2020-131910

(51) Int. Cl.
| | |
|---|---|
| *G01S 19/36* | (2010.01) |
| *B60R 11/02* | (2006.01) |
| *H01Q 1/32* | (2006.01) |
| *B60R 16/033* | (2006.01) |
| *G01S 17/86* | (2020.01) |
| *G01S 13/86* | (2006.01) |

(52) U.S. Cl.
CPC .............. *G01S 19/36* (2013.01); *B60R 11/02* (2013.01); *B60R 16/033* (2013.01); *H01Q 1/3233* (2013.01); *H01Q 1/3275* (2013.01); *G01S 13/86* (2013.01); *G01S 17/86* (2020.01)

(58) Field of Classification Search
CPC ....... G01S 19/36; B60R 11/02; B60R 16/033; H01Q 1/3233; H01Q 1/3275
USPC ..................................................... 342/357.76
See application file for complete search history.

(56) References Cited

U.S. PATENT DOCUMENTS

| 7,136,751 B2 * | 11/2006 | Pinto ....................... G01S 19/26 701/472 |
|---|---|---|
| 10,099,630 B1 | 10/2018 | Krishnan et al. |
| 11,693,120 B2 * | 7/2023 | Angelo ................... G01S 19/04 342/357.44 |
| 2003/0080908 A1 | 5/2003 | Mizutani |
| 2010/0109944 A1 * | 5/2010 | Whitehead ........... G05D 1/0278 702/130 |
| 2011/0031809 A1 | 2/2011 | Yoshida et al. |

(Continued)

FOREIGN PATENT DOCUMENTS

| CN | 107891828 A | * | 4/2018 | ........... B60R 16/033 |
|---|---|---|---|---|
| CN | 108664029 A | * | 10/2018 | ............. B60K 31/18 |

(Continued)

*Primary Examiner* — Harry K Liu
(74) *Attorney, Agent, or Firm* — Sughrue Mion, PLLC (57) ABSTRACT

Provided is a vehicle sensor mounting structure by which a GNSS antenna and at least one external sensor are mounted on a roof of a vehicle, the at least one external sensor being configured to detect an external state of the vehicle. The vehicle sensor mounting structure includes: a first wiring hole into which a sensor wiring line of the at least one external sensor is drawn to be placed under the roof, the first wiring hole being formed in the roof; and a second wiring hole into which an antenna wiring line of the GNSS antenna is drawn to be placed under the roof, the second wiring hole being formed in the roof.

5 Claims, 5 Drawing Sheets

(56) References Cited

U.S. PATENT DOCUMENTS

| | | | |
|---|---|---|---|
| 2014/0324291 A1* | 10/2014 | Jones | E02F 9/2054 |
| | | | 701/41 |
| 2017/0369106 A1 | 12/2017 | Williams et al. | |
| 2019/0277973 A1* | 9/2019 | Ewert | G01S 19/09 |
| 2023/0107068 A1* | 4/2023 | Imhoff | B64G 1/66 |
| | | | 342/357.44 |

FOREIGN PATENT DOCUMENTS

| | | | | |
|---|---|---|---|---|
| CN | 109417221 A | | 3/2019 | |
| CN | 110654321 A | * | 1/2020 | ......... B60R 11/0258 |
| CN | 114142221 A | * | 3/2022 | |
| FR | 3081548 A1 | * | 11/2019 | |
| JP | 2003-142911 A | | 5/2003 | |
| JP | 2011-055694 A | | 3/2011 | |
| WO | 2018/074215 A1 | | 4/2018 | |

* cited by examiner

VEHICLE SENSOR MOUNTING STRUCTURE

CROSS-REFERENCE TO RELATED APPLICATION

This application claims priority to Japanese Patent Application No. 2020-131910 filed on Aug. 3, 2020, incorporated herein by reference in its entirety.

BACKGROUND

1. Technical Field

The present disclosure relates to a vehicle sensor mounting structure.

2. Description of Related Art

In the related art, Japanese Unexamined Patent Application Publication No. 2011-055694 (JP 2011-055694 A) is known as a technical literature related to a vehicle sensor mounting structure. This publication describes that efficiency in reinforcement and arrangement operation is achieved by placing a wiring line for a sensor along a framework portion of a roof peripheral edge of a vehicle.

SUMMARY

In the meantime, in a case where a sensor or the like is provided on a roof of a vehicle, a wiring line is passed from the inside of the vehicle to a roof top so that the sensor is connected to a computing device or a power supply provided inside the vehicle. However, when various wiring lines are bundled and passed to the roof top, electrical interference might occur, and this might decrease the accuracy of the sensor due to noise.

In view of this, in the technical field, it is desired to provide a vehicle sensor mounting structure that can restrain electrical interference between wiring lines when the wiring lines are passed through a roof of a vehicle configured such that a sensor and so on are provided on the roof.

One aspect of the present disclosure is to provide a vehicle sensor mounting structure by which a global navigation satellite system (GNSS) antenna and at least one external sensor are mounted on a roof of a vehicle, the at least one external sensor being configured to detect an external state of the vehicle. The vehicle sensor mounting structure includes: a first wiring hole into which a sensor wiring line of the at least one external sensor is drawn to be placed under the roof, the first wiring hole being formed in the roof; and a second wiring hole into which an antenna wiring line of the GNSS antenna is drawn to be placed under the roof, the second wiring hole being formed in the roof.

The vehicle sensor mounting structure according to one aspect of the present disclosure includes the first wiring hole into which the sensor wiring line of the external sensor is drawn to be placed under the roof, and the second wiring hole into which the antenna wiring line of the GNSS antenna dealing with a signal weaker than that of the external sensor is drawn to be placed under the roof. Accordingly, in comparison with a conventional structure in which the wiring line of the external sensor and the antenna wiring line are passed through the same hole, it is possible to restrain electrical interference between the wiring lines when the wiring lines are passed through the roof.

In the vehicle sensor mounting structure according to one aspect of the present disclosure, the first wiring hole and the second wiring hole may be formed to be distanced from each other by a hole interference reduction distance or more. In the vehicle sensor mounting structure, the first wiring hole and the second wiring hole are formed to be distanced from each other by the hole interference reduction distance or more. Accordingly, it is possible to appropriately restrain the weak signal of the GNSS antenna from interfering with a signal of the external sensor.

In the vehicle sensor mounting structure according to one aspect of the present disclosure, the at least one external sensor and the GNSS antenna may be placed to be distanced from each other by a sensor interference reduction distance or more. In the vehicle sensor mounting structure, the external sensor and the GNSS antenna are formed to be distanced from each other by the sensor interference reduction distance or more. Accordingly, it is possible to appropriately restrain the weak signal of the GNSS antenna from interfering with the signal of the external sensor.

In the vehicle sensor mounting structure according to one aspect of the present disclosure, the sensor wiring line and the antenna wiring line may be placed to be distanced from each other by a wiring-line interference reduction distance or more. In the vehicle sensor mounting structure, the sensor wiring line and the antenna wiring line are placed to be distanced from each other by the wiring-line interference reduction distance or more. Accordingly, it is possible to restrain electrical interference between the wiring lines in parts other than the first wiring hole and the second wiring hole.

In the vehicle sensor mounting structure according to one aspect of the present disclosure, the roof of the vehicle may function as a shield by being connected to the ground via a conductive material. In the vehicle sensor mounting structure, the roof of the vehicle functions as a shield. Accordingly, even in a case where the sensor wiring line and the antenna wiring line are placed to be close to each other across the roof, it is possible to restrain electrical interference between the wiring lines.

In the vehicle sensor mounting structure according to one aspect of the present disclosure, the at least one external sensor may be connected to a power supply under the roof via a sensor power supply wiring line. The GNSS antenna may be connected to the power supply via an antenna power supply wiring line. The sensor power supply wiring line may connect the at least one external sensor to the power supply by passing through the first wiring hole. The antenna power supply wiring line may connect the GNSS antenna to the power supply by passing through the second wiring hole. In the vehicle sensor mounting structure, the sensor power supply wiring line of the external sensor is passed through the first wiring hole, and the antenna power supply wiring line of the GNSS antenna is passed through the second wiring hole. Accordingly, it is possible to restrain electrical interference of the sensor power supply wiring line of the external sensor with the antenna wiring line in comparison with a case where the sensor power supply wiring line is passed through the second wiring hole, and it is possible to restrain electrical interference of the antenna power supply wiring line with the sensor wiring line in comparison with a case where the antenna power supply wiring line is passed through the first wiring hole.

With the vehicle sensor mounting structure according to one aspect of the present disclosure, it is possible to restrain electrical interference between wiring lines when the wiring lines pass through a roof of a vehicle configured such that an external sensor and a GNSS antenna are provided on the roof.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below with reference to the drawings.

Figure 1:
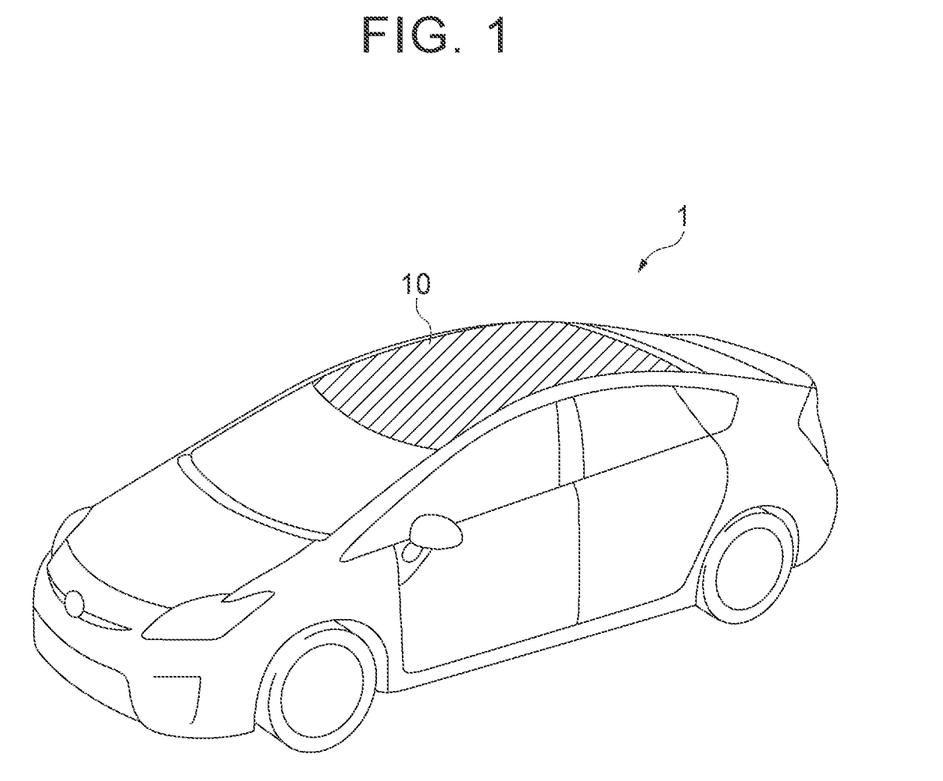
FIG. 1 is a view illustrating one example of a roof of a vehicle.

FIG. 1 is a view illustrating one example of a roof of a vehicle. A vehicle (vehicle body) 1 and a roof 10 are illustrated in FIG. 1. In a vehicle sensor mounting structure of the present embodiment, a GNSS antenna and at least one external sensor configured to detect an external state of the vehicle are provided on the roof of the vehicle illustrated in FIG. 1, for example. The external sensor and so on are not illustrated in FIG. 1. The vehicle is not limited in particular, provided that the vehicle includes a sufficiently wide roof. The vehicle may be a passenger car or a freight-train car.

The GNSS antenna is not limited in particular, provided that the GNSS antenna is an antenna that can receive a signal from a global navigation satellite system (GNSS). As frequency bands of a GNSS signal, an L1 frequency band (1575.42 MHz), an L2 frequency band (1227.60 MHz), and an L5 frequency band (1176.45 MHz) are known, for example.

Examples of the external sensor include a camera, a light detection and ranging sensor (LIDAR), a narrow-angle millimeter wave radar, an omni-directional millimeter wave radar, and so on. The camera is a sensor configured to detect an external state of the vehicle by image detection. The LIDAR is a detector configured to detect an object outside the vehicle by use of light. The narrow-angle millimeter wave radar and the omni-directional millimeter wave radar are detectors configured to detect an object outside the vehicle by use of radio waves (e.g., millimeter waves). The narrow-angle millimeter wave radar and the omni-directional wave radar have different detection ranges. The narrow-angle millimeter wave radar has a detection range with an angle narrower than that of the omni-directional millimeter wave radar.

It has been known that signal interference occurs between the external sensor and the GNSS antenna. The interference occurs such that the signal of the external sensor comes closer to a frequency band of the GNSS signal. More specifically, an LVDS signal reference clock generally used as a signal for the camera and the LIDAR is taken as an example. In this case, when the LVDS signal reference clock is 65 MHz, a frequency of 1170 MHz that is 18 times as large as 65 MHz is close to the L5 frequency band (1176.45 MHz) of the GNSS signal, so that interference occurs. A frequency of 1235 MHz that is 19 times as large as 65 MHz is also close to the L2 frequency band (1227.60 MHz), so that interference occurs. When the LVDS signal reference clock is 112 MHz, a frequency of 1568 MHz that is 14 times as large as 112 MHz is close to the L1 frequency band (1575.42 MHz) of the GNSS signal, so that interference occurs. As such, in a case where the external sensor and the GNSS antenna are provided on the roof 10 of the vehicle 1, signal interference becomes a problem.

Figure 2:
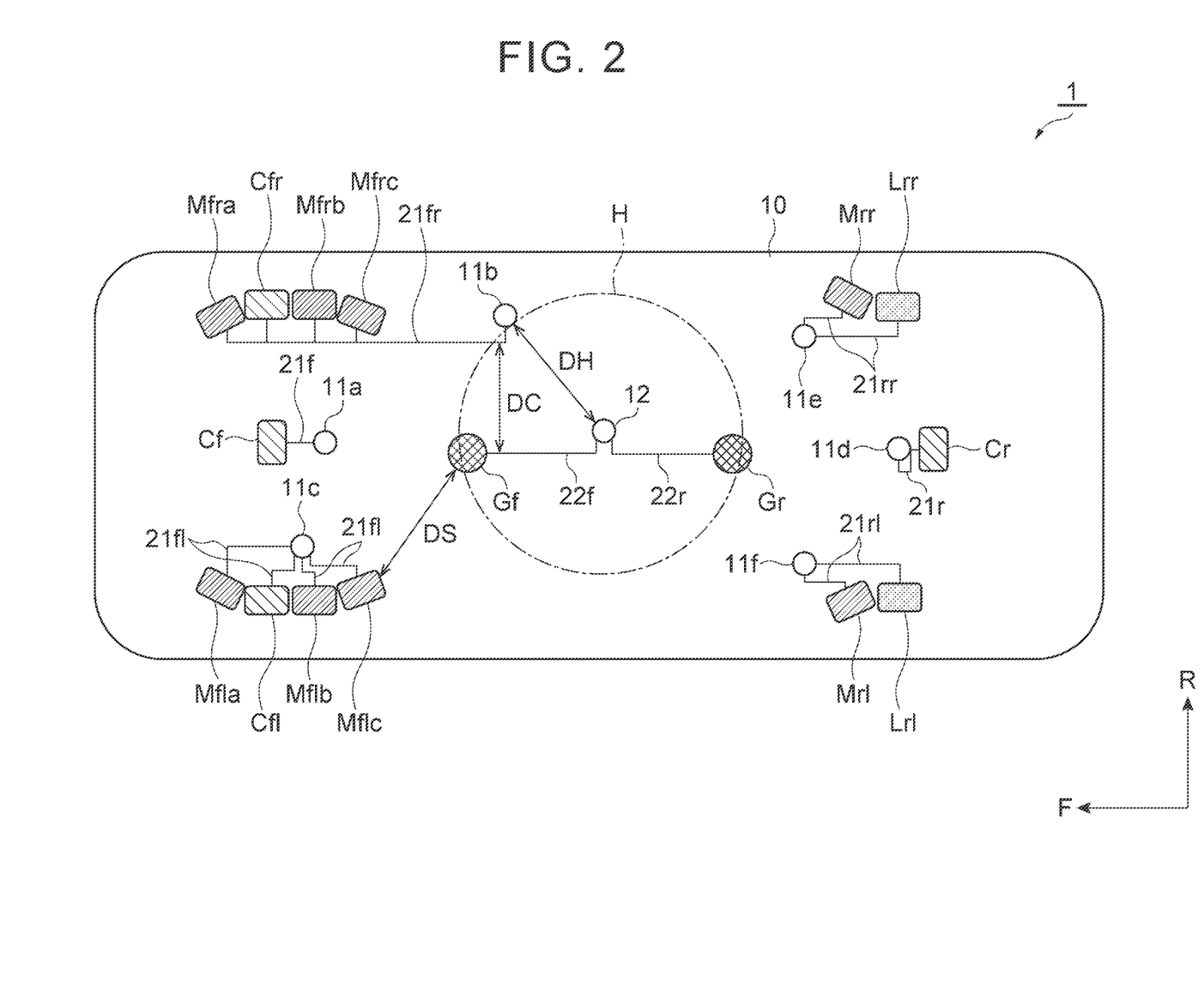
FIG. 2 is a view illustrating one example of the arrangement of wiring lines of external sensors and antenna wiring lines of GNSS antennas on the roof of the vehicle.

FIG. 2 is a view illustrating one example of the arrangement of wiring lines of external sensors and antenna wiring lines of global navigation satellite system (GNSS) antennas on the roof of the vehicle. FIG. 2 illustrates a coordinate system in which the forward direction of the vehicle 1 is referred to as F, and the right direction of the vehicle 1 is referred to as R.

In FIG. 2, as examples of the external sensors provided on the roof 10, a front camera Cf, a front right camera Cfr, a front left camera Cfl, a rear camera Cr, a rear right LIDAR Lrr, a rear left LIDAR Lrl, a first front right narrow-angle millimeter wave radar Mfra, a second front right narrow-angle millimeter wave radar Mfrb, a third front right narrow-angle millimeter wave radar Mfrc, a first front left narrow-angle millimeter wave radar Mfla, a second front left narrow-angle millimeter wave radar Mflb, a third front left narrow-angle millimeter wave radar Mflc, a rear right narrow-angle millimeter wave radar Mrr, and a rear left narrow-angle millimeter wave radar Mrl are illustrated. Further, as examples of the GNSS antennas provided on the roof 10, a front GNSS antenna Gf and a rear GNSS antenna Gr are illustrated. Hereinafter, when the external sensors are generally referred to, their reference signs are omitted.

Next will be described the arrangement of wiring holes and wiring lines in FIG. 2. As illustrated in FIG. 2, as first wiring holes into which wiring lines of the external sensors are drawn to be placed under the roof 10, a front wiring hole 11a, a front right wiring hole 11b, a front left wiring hole 11c, a rear wiring hole 11d, a rear right wiring hole 11e, and a rear left wiring hole 11f are provided in the roof 10.

A sensor wiring line 21f connected to the front camera Cf is passed through the front wiring hole 11a. A sensor wiring line 21fr connected to the front right camera Cfr, the first front right narrow-angle millimeter wave radar Mfra, the second front right narrow-angle millimeter wave radar Mfrb, and the third front right narrow-angle millimeter wave radar Mfrc is passed through the front right wiring hole 11b.

Sensor wiring lines 21fl connected to the front left camera Cfl, the first front left narrow-angle millimeter wave radar Mfla, the second front left narrow-angle millimeter wave radar Mflb, and the third front left narrow-angle millimeter wave radar Mflc are passed through the front left wiring hole 11c. Hereinafter, when the sensor wiring lines are generally referred to, their reference signs are omitted. As the sensor wiring lines, parts of wiring lines directed toward respective sensors may be bundled up like the sensor wiring line 21fr, or respective wiring lines may be placed separately for respective sensors like the sensor wiring lines 21fl.

A sensor wiring line 21r connected to the rear camera Cr is passed through the rear wiring hole 11d. Sensor wiring lines 21rr connected to the rear right LIDAR Lrr and the rear right narrow-angle millimeter wave radar Mrr are passed through the rear right wiring hole 11e. Sensor wiring lines 21rl connected to the rear left LIDAR Lrl and the rear left narrow-angle millimeter wave radar Mrl are passed through the rear left wiring hole 11f.

Further, a central wiring hole 12 is provided in the roof 10 as a second wiring hole into which antenna wiring lines of the GNSS antennas (the front GNSS antenna Gf and the rear GNSS antenna Gr) are drawn to be placed under the roof 10. An antenna wiring line 22f connected to the front GNSS antenna Gf and an antenna wiring line 22r connected to the rear GNSS antenna Gr are passed through the central wiring hole 12.

As illustrated in FIG. 2, the central wiring hole 12 and the front right wiring hole 11b are formed to be distanced from each other by a hole interference reduction distance DH or more. The front right wiring hole 11b is a hole closest to the second wiring hole (the central wiring hole 12) among the first wiring holes through which the sensor wiring lines are passed. That is, in the present embodiment, the first wiring holes (the front right wiring hole 11b and so on) through which the sensor wiring lines are passed and the second wiring hole (the central wiring hole 12) through which the first antenna wiring lines are passed are formed such that the first wiring holes are distanced from the second wiring hole by the hole interference reduction distance DH or more. In FIG. 2, a virtual circle H is illustrated. The virtual circle H is a circle set such that its radius from the central wiring hole 12 as the center of the circle is equal to the hole interference reduction distance DH.

The hole interference reduction distance DH is a distance determined in advance and is measured as a linear distance in a plan view, for example. The hole interference reduction distance DH can be 127 mm, for example. The hole interference reduction distance DH may be 254 mm in consideration of safety factor. As for the value, TIA/EIA569 determined by American National Standards Institute (ANSI) can be referred to, for example. The hole interference reduction distance DH can be changed in accordance with signal strengths of the sensor wiring lines and the antenna wiring lines, as a distance that can appropriately restrain influences of electrostatic induction and electromagnetic induction, for example.

As illustrated in FIG. 2, the front GNSS antenna Gf and the third front left narrow-angle millimeter wave radar Mflc are placed to be distanced from each other by a sensor interference reduction distance DS or more. The third front left narrow-angle millimeter wave radar Mflc is an external sensor closest to the front GNSS antenna Gf on the roof 10. Note that no external sensor is provided at positions distanced from the rear GNSS antenna Gr by less than the sensor interference reduction distance DS. That is, in the present embodiment, the external sensors (the third front left narrow-angle millimeter wave radar Mflc and so on) and the GNSS antennas (the front GNSS antenna Gf and the rear GNSS antenna Gr) are placed such that the external sensors are distanced from the GNSS antennas by the sensor interference reduction distance DS or more.

The sensor interference reduction distance DS can be set to the same distance as the hole interference reduction distance DH, for example. The sensor interference reduction distance DS is measured as a linear distance from an end part, of an external sensor, that is closest to a GNSS antenna to an end part, of the GNSS antenna, that is closest to the external sensor, for example. The sensor interference reduction distance DS may be a distance longer than the hole interference reduction distance DH or may be a distance shorter than the hole interference reduction distance DH.

As illustrated in FIG. 2, the sensor wiring line 21fr and the antenna wiring line 22f are placed to be distanced from each other by a wiring-line interference reduction distance DC or more. The sensor wiring line 21fr is a sensor wiring line closest to the antenna wiring lines 22f, 22r on the roof 10. That is, in the present embodiment, the sensor wiring lines (the sensor wiring line 21fr and so on) of the external sensors and the antenna wiring lines 22f, 22r are placed such that the sensor wiring lines are distanced from the antenna wiring lines 22f, 22r by the wiring-line interference reduction distance DC or more within a whole range on the roof 10.

The wiring-line interference reduction distance DC can be set to the same distance as the hole interference reduction distance DH, for example. The wiring-line interference reduction distance DC is measured as a shortest distance from the sensor wiring lines to the antenna wiring lines. The wiring-line interference reduction distance DC may be a distance longer than the hole interference reduction distance DH.

Figure 3:
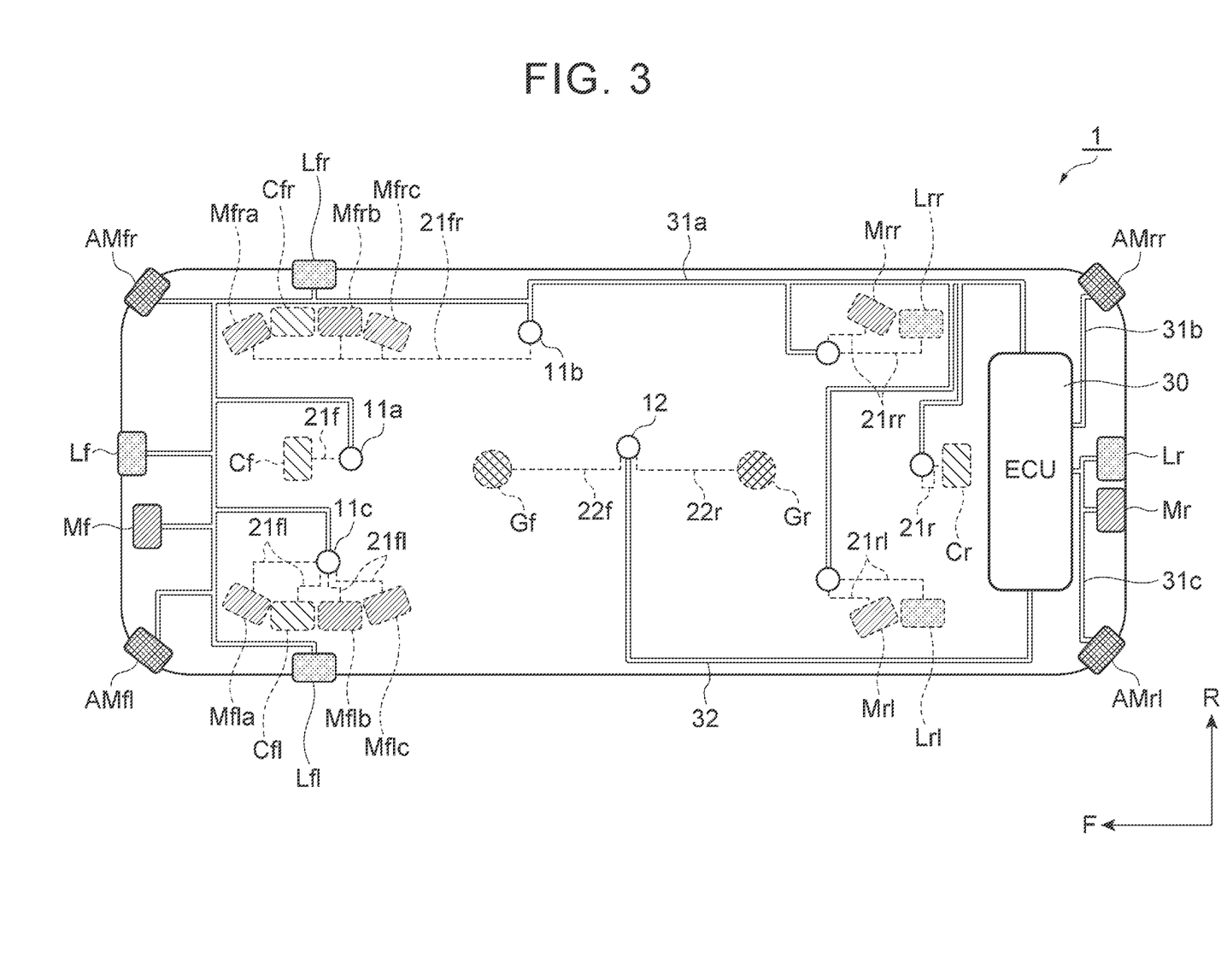
FIG. 3 is a view illustrating one example of the arrangement of wiring lines of the external sensors and antenna wiring lines of the GNSS antennas inside the vehicle.

FIG. 3 is a view illustrating one example of the arrangement of wiring lines of external sensors and antenna wiring lines of the GNSS antennas inside the vehicle. In FIG. 3, elements (the external sensors, the sensor wiring lines, the GNSS antennas, and the antenna wiring lines) on the roof 10 are indicated by broken lines.

In FIG. 3, as examples of external sensors provided at positions under the roof 10, a front LIDAR Lf, a front right LIDAR Lfr, a front left LIDAR Lfl, a rear LIDAR Lr, a front right omni-directional millimeter wave radar AMfr, a front narrow-angle millimeter wave radar Mf, a rear narrow-angle millimeter wave radar Mr, a front left omni-directional millimeter wave radar AMfl, a rear right omni-directional millimeter wave radar AMrr, and a rear left omni-directional millimeter wave radar AMrl are illustrated.

Further, in FIG. 3, an electronic control unit (ECU) 30, vehicle-body-side sensor wiring lines 31a, 31b, 31c via which the external sensors are connected to the ECU 30, and a vehicle-body-side antenna wiring line 32 via which the GNSS antennas are connected to the ECU 30 are illustrated.

The ECU 30 is an electronic control unit including a central processing unit (CPU), a read only memory (ROM), a random access memory (RAM), and so on. The ECU 30 loads programs stored in the ROM to the RAM and implements various computing by executing the programs loaded in the RAM by the CPU, for example. The ECU 30 may be constituted by a plurality of electronic control units.

The ECU 30 includes a function of a GNSS receiver configured to receive signals that have been received by the GNSS antennas. The ECU 30 executes a host-vehicle position estimation process of estimating the position of the vehicle on a map based on the signals thus received by the GNSS antennas, for example. The ECU 30 may have a function as a signal converter configured to convert signals of the external sensors into signals for computing. The ECU 30 performs an external environment recognition process of recognizing positions and the like of other vehicles outside the vehicle based on the signals from the external sensors, for example.

The vehicle-body-side sensor wiring line 31a is a wiring line via which all the external sensors on the roof 10 are connected to the ECU 30. The vehicle-body-side sensor wiring line 31a is connected to the sensor wiring line 21f on the roof 10 through the front wiring hole 11a. The vehicle-body-side sensor wiring line 31a is connected to the sensor wiring line 21fr on the roof 10 through the front right wiring hole 11b. The vehicle-body-side sensor wiring line 31a is connected to the sensor wiring lines 21fl on the roof 10 through the front left wiring hole 11c. Similarly, the vehicle-body-side sensor wiring line 31a is connected to the sensor wiring line 21r, the sensor wiring lines 21rr, and the sensor wiring lines 21rl through the rear wiring hole 11d, the rear right wiring hole 11e, and the rear left wiring hole 11f, respectively.

Further, the vehicle-body-side sensor wiring line 31a is connected to the front LIDAR Lf, the front right LIDAR Lfr, the front left LIDAR Lfl, the front right omni-directional millimeter wave radar AMfr, the front narrow-angle millimeter wave radar Mf, and the front left omni-directional millimeter wave radar AMfl among the external sensors placed under the roof 10.

The vehicle-body-side sensor wiring lines 31b, 31c are connected only to the external sensors placed under the roof 10 without passing through any of the wiring holes. The vehicle-body-side sensor wiring line 31b is a wiring line extending rearward from the ECU 30 and directed toward the right side so as to connect the ECU 30 to the rear right omni-directional millimeter wave radar AMrr. The vehicle-body-side sensor wiring line 31c is a wiring line extending rearward from the ECU 30 so as to connect the ECU 30 to the rear narrow-angle millimeter wave radar Mr, the rear LIDAR Lr, and the rear left omni-directional millimeter wave radar AMrl.

The vehicle-body-side antenna wiring line 32 is a wiring line via which the GNSS antennas Gf, Gr are connected to the ECU 30. The vehicle-body-side antenna wiring line 32 is connected to the antenna wiring lines 22f, 22r on the roof 10 through the central wiring hole 12.

The vehicle-body-side antenna wiring line 32 is placed to be distanced from the vehicle-body-side sensor wiring lines 31a, 31b, 31c. The vehicle-body-side antenna wiring line 32 may be placed to be distanced from the vehicle-body-side sensor wiring lines 31a, 31b, 31c by the wiring-line interference reduction distance DC or more. In FIG. 3, by also taking a distance in the height direction, for example, the vehicle-body-side antenna wiring line 32 can be placed to be distanced from the vehicle-body-side sensor wiring line 31c closest to the vehicle-body-side antenna wiring line 32 by the wiring-line interference reduction distance DC or more. Alternatively, the vehicle-body-side antenna wiring line 32 or the vehicle-body-side sensor wiring line 31c may be partially provided with a shielding part configured to reduce interference between the wiring lines.

Next will be described a form in which the roof 10 functions as a shield. For example, by using a conductive material for the roof 10 and parts (a pillar, a side member, and the like) connected to tires in the vehicle (vehicle body) 1 illustrated in FIG. 1, the roof 10 can be connected to the ground. The roof 10 is connected to a front body pillar, a center body pillar, a quarter panel, and so on by spot welding, for example.

Further, the roof 10 is formed by use of a conductive material so that the roof 10 can function as a shield. The conductive material is a material having a conductivity such as metal or conductive resin. The conductive material is not limited in particular, provided that the conductive material has a conductivity that allows the roof 10 to function as a shield.

Figure 4:
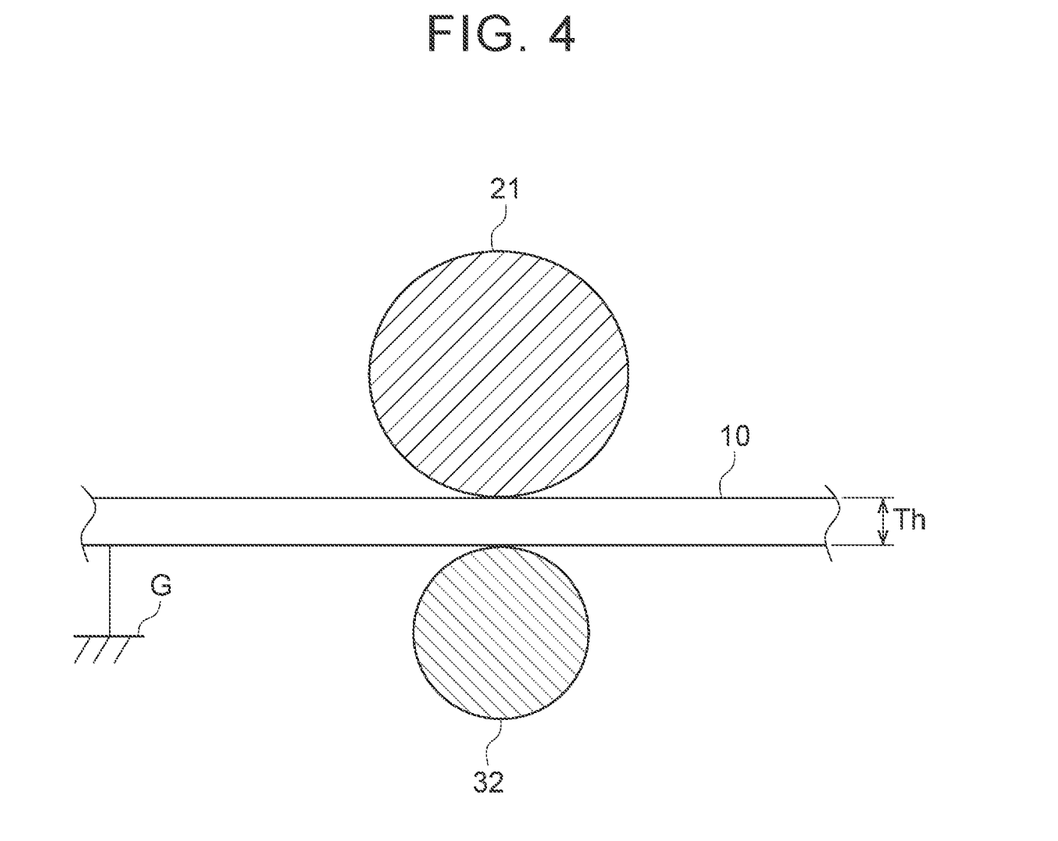
FIG. 4 is a view to describe the relationship between a wiring line on the roof and a wiring line under the roof.

FIG. 4 is a view to describe the relationship between a wiring line on the roof 10 and a wiring line under the roof 10. As an example for descriptions, FIG. 4 illustrates a case where the sensor wiring line 21 and the vehicle-body-side antenna wiring line 32 are placed across the roof 10. In this case, a thickness Th of the roof 10 can be 1 mm or more, for example. As the thickness Th of the roof 10 is thicker, a higher damping effect can be achieved. The thickness Th of the roof 10 may be determined based on the thickness of an insulator covering a wiring line and the frequency of a signal.

Figure 5:
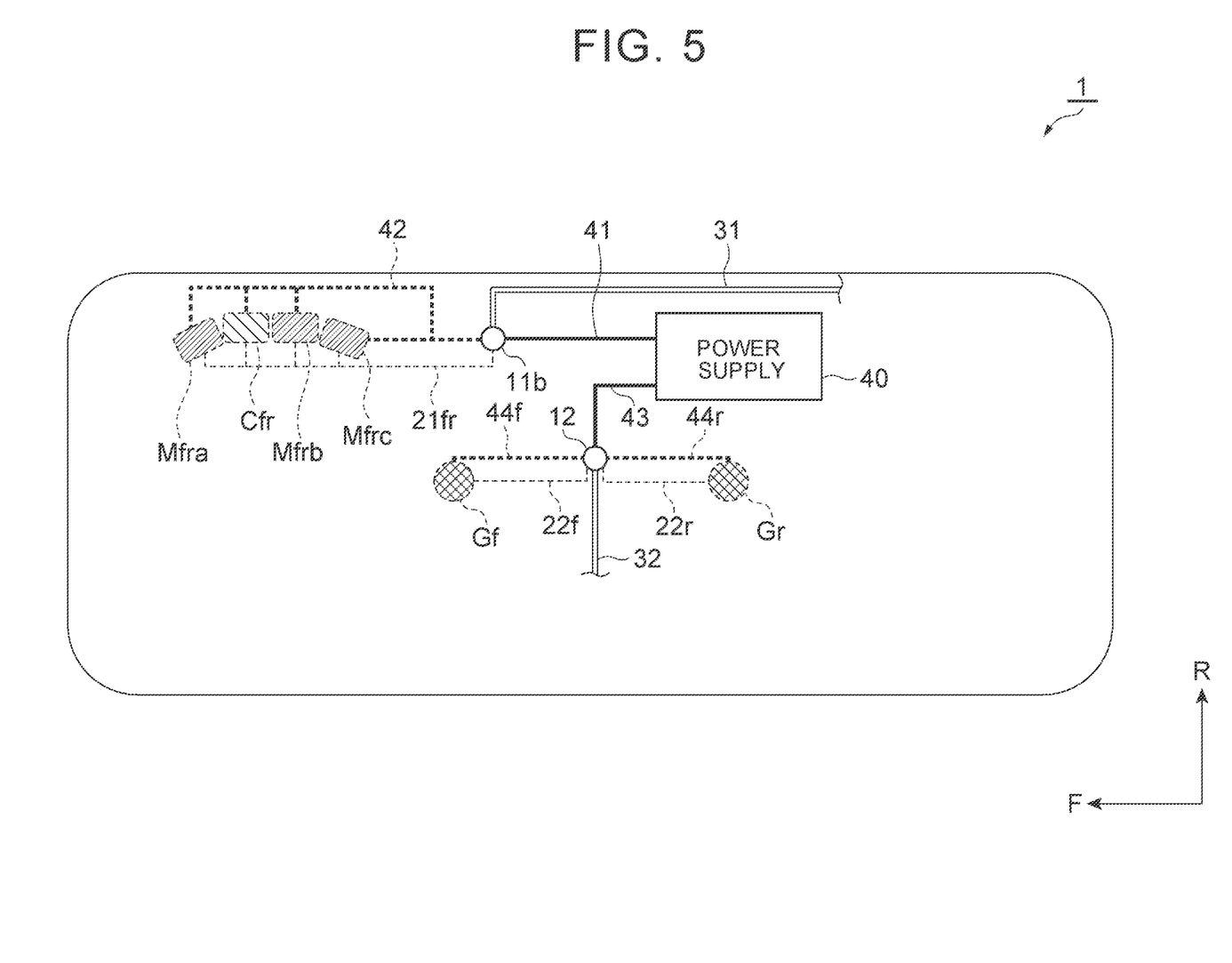
FIG. 5 is a view illustrating one example of sensor power supply wiring lines of the external sensors and antenna power supply wiring lines of the GNSS antennas.

Next will be described power supply wiring lines. FIG. 5 is a view illustrating one example of sensor power supply wiring lines of the external sensors and antenna power supply wiring lines of the GNSS antennas. FIG. 5 illustrates a power supply 40 placed on the vehicle-body side (under the roof 10), a vehicle-body-side sensor power supply wiring line 41 connected to the power supply 40, a sensor power supply wiring line 42 connected to the external sensors on the roof 10, a vehicle-body-side antenna power supply wiring line 43 connected to the power supply 40, an antenna power supply wiring line 44f connected to the front GNSS antenna Gf, and an antenna power supply wiring line 44r connected to the rear GNSS antenna Gr. The power supply 40 is a capacitor of the vehicle 1, for example.

The vehicle-body-side sensor power supply wiring line 41 is connected to the sensor power supply wiring line 42 on the roof 10 through the front right wiring hole 11b. As one example in FIG. 4, the sensor power supply wiring line 42 is connected to the front right camera Cfr, the first front right narrow-angle millimeter wave radar Mfra, the second front right narrow-angle millimeter wave radar Mfrb, and the third front right narrow-angle millimeter wave radar Mfrc. Note that respective sensor power supply wiring lines may be provided separately for respective sensors.

In order to reduce electrical interference with signals of the front GNSS antenna Gf and the rear GNSS antenna Gr, the sensor power supply wiring line 42 may be placed to be distanced from the antenna wiring lines 22f, 22r by a predetermined distance (e.g., the wiring-line interference reduction distance DC) or more. Similarly, the vehicle-body-side sensor power supply wiring line 41 may be placed to be distanced from the vehicle-body-side antenna wiring line 32 by a predetermined distance (e.g., the wiring-line interference reduction distance DC) or more.

The vehicle-body-side antenna power supply wiring line 43 is connected to the antenna power supply wiring lines 44f, 44r on the roof 10 through the central wiring hole 12. In order to reduce electrical interference with signals of the external sensors, the vehicle-body-side antenna power supply wiring line 43 may be placed to be distanced from the vehicle-body-side sensor wiring line 31 by a predetermined distance (e.g., the wiring-line interference reduction distance DC) or more. Similarly, the antenna power supply wiring lines 44f, 44r may be distanced from the sensor wiring line 21fr by a predetermined distance (e.g., the wiring-line interference reduction distance DC) or more. The antenna power supply wiring lines 44f, 44r may be placed to be distanced from all the sensor wiring lines (the sensor wiring line 21f and so on) by a predetermined distance (e.g., the wiring-line interference reduction distance DC) or more.

In addition to that, in a case where a heater power line for a sensor defroster is used as the wiring line such as the power supply wiring line that deals with a large current, the heater power line may be placed to be distanced from the sensor wiring lines and the antenna wiring lines 22f, 22r by a predetermined distance (e.g., the wiring-line interference reduction distance DC) or more.

The vehicle sensor mounting structure according to the present embodiment described above includes the first wiring holes 11a to 11f into which the sensor wiring lines of the external sensors are drawn to be placed under the roof 10, and the second wiring hole (the central wiring hole) 12 into which the antenna wiring lines 22f, 22r of the GNSS antennas Gf, Gr dealing with signals weaker than those of the external sensors are drawn to be placed under the roof 10. Accordingly, in comparison with a conventional structure in which the wiring lines of the external sensors and the antenna wiring lines 22f, 22r are passed through the same hole, it is possible to restrain electrical interference between the wiring lines when the wiring lines are passed through the roof 10.

Further, in the vehicle sensor mounting structure, the first wiring holes 11a to 11f and the second wiring hole 12 are formed such that the first wiring holes 11a to 11f are distanced from the second wiring hole 12 by the hole interference reduction distance DH or more. Accordingly, it is possible to appropriately restrain weak signals of the GNSS antennas Gf, Gr from interfering with signals of the external sensors. Further, in the vehicle sensor mounting structure, the external sensors and the GNSS antennas Gf, Gr are formed on the roof 10 such that the external sensors are distanced from the GNSS antennas Gf, Gr by the sensor interference reduction distance DS or more. Accordingly, it is possible to appropriately restrain weak signals of the GNSS antennas Gf, Gr from interfering with signals of the external sensors.

In the vehicle sensor mounting structure, the sensor wiring lines and the antenna wiring lines 22f, 22r are placed on the roof 10 such that the sensor wiring lines are distanced from the antenna wiring lines 22f, 22r by the wiring-line interference reduction distance DC or more. Accordingly, it is possible to restrain electrical interference between the wiring lines in parts other than the first wiring holes 11a to 11f and the second wiring hole 12.

In the vehicle sensor mounting structure, the roof 10 of the vehicle 1 functions as a shield. Accordingly, even in a case where the sensor wiring lines and the antenna wiring lines 22f, 22r are placed to be close to each other across the roof 10, it is possible to restrain electrical interference between the wiring lines.

Further, in the vehicle sensor mounting structure, the sensor power supply wiring lines 41, 42 of the external sensors are passed through the first wiring hole (11b in FIG. 4), and the antenna power supply wiring lines 43, 44f, 44r of the GNSS antennas Gf, Gr are passed through the second wiring hole 12. Accordingly, it is possible to restrain electrical interference of the sensor power supply wiring lines 41, 42 with the antenna wiring lines 22f, 22r in comparison with a case where the sensor power supply wiring lines 41, 42 are passed through the second wiring hole 12, and it is possible to restrain electrical interference of the antenna power supply wiring lines 43, 44f, 44r with the sensor wiring lines in comparison with a case where the antenna power supply wiring lines 43, 44f, 44r are passed through the first wiring holes 11a to 11f.

The embodiment of the present disclosure has been described above, but the present disclosure is not limited to the above embodiment. The present disclosure can be performed in various forms including various alterations and modifications made based on the knowledge of a person skilled in the art, in addition to the above embodiment.

The positions of the first wiring holes and the second wiring hole on the roof 10 are not limited in particular. It is not necessary for the second wiring hole to be the central wiring hole placed near the center of the roof 10. The second wiring hole may be provided on the outer peripheral side of the roof 10, and the first wiring holes may be provided near the center of the roof 10.

The arrangement of the external sensors, the GNSS antennas, and the wiring lines as illustrated in FIGS. 2, 3, and 5 are just one example, and the number of the external sensors, types of the external sensors, positions of the external sensors are not limited in particular. The number of the GNSS antennas may be one, and the positions of the GNSS antennas on the roof 10 are also not limited. The wiring lines may not be placed to be distanced from each other by the sensor interference reduction distance DS or more, provided that the wiring lines are subjected to coating treatment to have appropriate insulating properties. In this case, it is not necessary for the first wiring holes and the second wiring hole to be formed such that the first wiring holes are distanced from the second wiring hole by the hole interference reduction distance DH or more. In a case where the external sensors or the GNSS antennas employ a structure that can sufficiently restrain electrical interference, it is not necessary for the external sensors and the GNSS antennas to be placed such that the external sensors are distanced from the GNSS antennas by the sensor interference reduction distance DS or more.

In terms of the power supply wiring lines, the sensor power supply wiring lines 41, 42 may be passed through the second wiring hole 12 if necessary in design, and the antenna power supply wiring lines 43, 44f, 44r may be passed through the first wiring holes 11a to 11f.

What is claimed is:

1. A vehicle sensor mounting structure by which a GNSS antenna and at least one external sensor are mounted on a roof of a vehicle, the at least one external sensor being configured to detect an external state of the vehicle, the vehicle sensor mounting structure comprising:
    a first wiring hole into which a sensor wiring line of the at least one external sensor is drawn to be placed under the roof, the first wiring hole being formed in the roof; and
    a second wiring hole into which an antenna wiring line of the GNSS antenna is drawn to be placed under the roof, the second wiring hole being formed in the roof, wherein
    the at least one external sensor is connected to a power supply under the roof via a sensor power supply wiring line;
    the GNSS antenna is connected to the power supply via an antenna power supply wiring line;
    the sensor power supply wiring line connects the at least one external sensor to the power supply by passing through the first wiring hole; and
    the antenna power supply wiring line connects the GNSS antenna to the power supply by passing through the second wiring hole.

2. The vehicle sensor mounting structure according to claim 1, wherein the first wiring hole and the second wiring hole are formed to be distanced from each other by a hole interference reduction distance or more.

3. The vehicle sensor mounting structure according to claim 1, wherein the at least one external sensor and the GNSS antenna are placed to be distanced from each other by a sensor interference reduction distance or more.

4. The vehicle sensor mounting structure according to claim 1, wherein the sensor wiring line and the antenna wiring line are placed to be distanced from each other by a wiring-line interference reduction distance or more.

5. The vehicle sensor mounting structure according to claim 1, wherein the roof of the vehicle functions as a shield by being connected to ground via a conductive material.

* * * * *